United States Patent [19]

Fedelem et al.

[11] Patent Number: 4,886,182
[45] Date of Patent: Dec. 12, 1989

[54] FUEL FILLER ASSEMBLY

[75] Inventors: William E. Fedelem; Robert B. Hutter, both of Livonia, Mich.

[73] Assignee: Chrysler Motors Corporation, Highland Park, Mich.

[21] Appl. No.: 357,235

[22] Filed: May 26, 1989

[51] Int. Cl.4 .............................................. B65B 3/00
[52] U.S. Cl. .................................. 220/85 F; 220/86 R; 141/331; 141/338
[58] Field of Search ............... 220/85 F, 86 R, 85 SP; 141/DIG. 33, 331, 338

[56] References Cited

U.S. PATENT DOCUMENTS

| | | | |
|---|---|---|---|
| 1,242,453 | 10/1917 | Lester | 141/338 |
| 1,496,741 | 6/1924 | Richards | 220/86 R |
| 2,054,145 | 9/1936 | Tandy | 220/55 |
| 2,409,532 | 10/1946 | Bentley et al. | 220/86 R |
| 3,903,942 | 9/1975 | Vest | 141/331 X |
| 4,234,098 | 11/1980 | Miller et al. | 220/86 R |
| 4,498,600 | 2/1985 | Blion | 220/255 |
| 4,509,567 | 4/1985 | Harrison et al. | 220/86 R X |
| 4,560,081 | 12/1985 | Adams | 220/85 SP X |
| 4,703,867 | 11/1987 | Schoenhard | 220/85 F |
| 4,811,763 | 3/1989 | Kupske | 220/85 F X |

Primary Examiner—Steven M. Pollard
Attorney, Agent, or Firm—Kenneth H. MacLean, Jr.

[57] ABSTRACT

For a vehicle with a body opening to a fuel filler inlet tube and a pivotal cover panel normally covering the body opening, a funnel member loosely supported in the inlet tube which is attached to the panel so that the funnel is moved axially in the tube to a more outward position as the panel is pivoted to an open operative position.

5 Claims, 1 Drawing Sheet

FUEL FILLER ASSEMBLY

BACKGROUND OF THE INVENTION

1. Field of the Invention

This application concerns a fuel filler assembly for a vehicle of the type including a hinged cover panel, an attached closure member for the end of the tank inlet or fill tube and a pop-up funnel which guides the filler nozzle of the fuel delivery pump as its inserted into the fill tube.

2. Description of the Prior Art

There many arrangements for closing the end of the inlet or filler tube of a vehicle fuel tank. For many years, it has been common to position or recess the inlet of the fuel tank's fill tube inwardly from the outer surface of the vehicle body surrounding the fill opening. The tank's inlet opening is normally covered and sealed by a closure member. The closure is typically covered by and attached to a cover panel which is hinge mounted to the body so that the cover panel is flush with the body when closed. It is also known to provide attachment means between the cover panel and the closure member so that in the event of movement between the cover panel and the closure, they separate so that the fuel tank remains closed. Such an arrangement is disclosed in U.S. Pat. No. 4,498,600 to Bleon which was filled May 24, 1983 and was issued Feb. 12, 1985.

It is also known to provide a connection between a hinged filler door or closure for a fuel tank inlet and another mechanism. An example of this arrangement is disclosed in the U.S. Pat. No. 2,054,145 to Tandy which was filled Jan. 19, 1934 and was issued Sept. 15, 1936. In Tandy, the hinged door is connected by a link member to a second hinged door or valve so that the two doors move in unison.

SUMMARY OF THE INVENTION

This application concerns an improved filler assembly for a fuel tank inlet including a hinged cover panel, an inlet closure seal attached to the panel and a funnel member in the fuel tank inlet. The funnel member is attached to the closure seal and thus indirectly to the cover panel so that it is moved from its stored position in the fuel tank's inlet tube to a fill operation position as the hinged panel and closure member are pivoted from the closed position to an open position. The funnel member is adapted to receive the outlet end or fill nozzle of a fuel pump.

The funnel member is mold formed of tough elastomeric plastic material and is integrally linked to the seal closure by a thin, flexible strap. The strap is attached to the closure so that if the closure is separated from the hinged cover panel, the opening to the fill inlet remains sealed. When the cover panel is pivoted to an opened position, the funnel member is axially moved outward in the fill tube so it conveniently receives the nozzle of the fuel pump.

Therefore, an advantageous feature of the subject fill assembly is the automatic access to the funnel to guide the fill nozzle simply by the opening of the cover panel.

Other advantageous features of the subject fill assembly will be more readily apparent after an examination of the drawings of a preferred embodiment and a reading of the following detailed description of the embodiment which follows.

IN THE DRAWINGS

FIG. 1 is an elevational sectioned view of the fill assembly with the cover panel in a closed position; and FIG. 2 is a view similar to FIG. 1 but with the cover panel in the opened position; and FIG. 3 is a sectioned view taken along section line 3—3 in FIG. 2 and looking in the direction of the arrows.

DETAILED DESCRIPTION OF THE INVENTION

Figure 1:
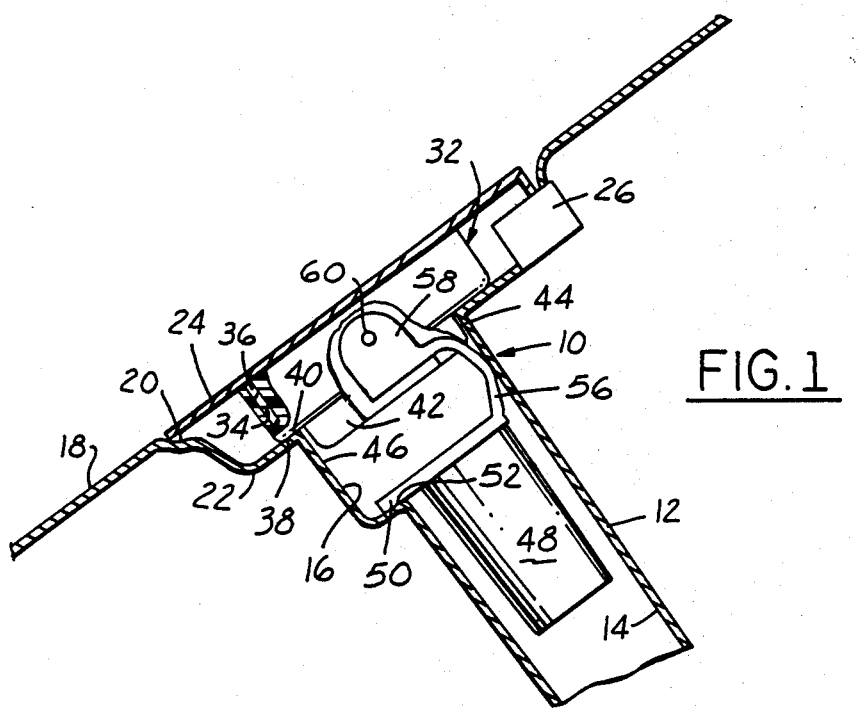

In the drawings, a fuel tank fill assembly 10 is illustrated. The assembly 10 has a tubular inlet member 12 leading to a fuel tank (not shown). Member 12 defines a passage 14 which directs fuel to the tank. Passage 14 has an inlet end portion 16 which is recessed relative to an body surface 18 of an associated vehicle. Thus, the fuel tank inlet is not flush with the body surface. The body 18 defines an enlarged opening 20 which is connected by wall means 22 to the inlet end of the tubular member 12.

As shown in FIG. 1, the opening 20 is normally concealed by a cover panel 24 which is mounted flush with the body surface 18. The panel 24 is attached to the stationary body of the vehicle by a hinge means 26. Hinge means 26 permits the panel to pivot to the opened position shown in FIG. 2 which allows a nozzle end 28 of a fuel dispenser 30 to the passage 14 for filling the associated fuel tank.

The passage 14 is normally closed to the atmosphere by a closure seal member 32 as shown in FIG. 1. The closure seal member 32 is generally annularly shaped and is molded of semi-rigid elastomeric material. The member 32 is attached to the cover panel 24 in a manner allowing it to separate therefrom when there is movement between the panel and the closure seal. Specifically, the member 32 has an annular or circular configured channel 34 formed therein which receives a similarly configured edge 36 extending from the underside of the panel 24.

To seal the passage 14, a shoulder portion 38 is formed in the member 32 and positioned so that it contacts a surface 40 of wall portion 22. Further, the member 32 has a reduced diameter portion 42 which extends into the inlet and has a side surface 44 which snugly engages the wall portion 46 to secure the closure 32 therein.

A funnel member 48 is loosely supported in the passage 14 and has a flange portions 50 extending about its upper end. When the panel is in the closed position shown in FIG. 1, the flange 50 rests against shoulder surface 52 of the wall means 22.

Figure 3:
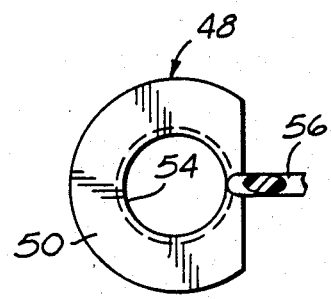
Figure 2:
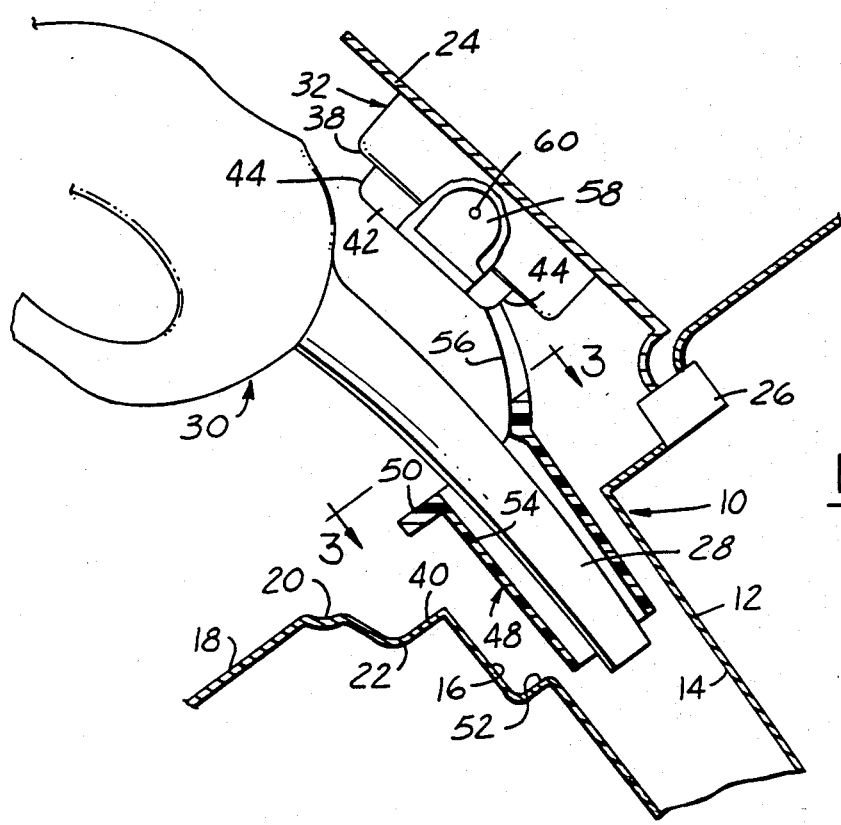

When the panel 48 is in the opened position shown in FIG. 2, the funnel is axially moved outward in the inlet so that it is conveniently accessible to the nozzle 28. The funnel 48 has an annular shape with a passage 54 therethrough. The funnel 48 is lifted from the inward position to the outward position by the pivoting of the cover panel 24 which moves the closure seal 32 therewith. Funnel 48 has a thin and flexible strap portion 54 molded integral therewith. Strap portion 56 has an end portion 58 which is received within the central portion of the closure seal member 32. End portion 58 is attached to the closure seal 32 by means of a pin 60. The pin supports the end portion 58 so that it can pivot slightly relative to the closure seal 32. This pivoting is helpful as the strap is flexed when the funnel moves axially in the passage 14. Preferably, the strap 56 has a rounded cross-section as shown in FIG. 3.

Although only a single embodiment of the filler assembly has been described and illustrated in detail, it is obvious that variations may be made to the design and the components and still fall within the scope of the following claims which define the invention.

I claim:

1. An improved fuel filler assembly for a fuel tank tubular inlet, comprising: a closure member pivotal between a closed operative position sealing the inlet tube and an opened operative position to allow a fuel pump's fill nozzle to enter the tube; a generally cylindrically shaped and tubular funnel member in the inlet tube and having a radially outwardly extending flange adapted to engage portions of the inlet to limit axial insertion of the funnel into the tube when in a closed operative position; a flexible strap extending between the funnel member and the pivotal closure member having a sufficient length so that the funnel is moved axially outward from the closed position to an axially outward opened position whereby the funnel is more accessible for conveniently receiving the fuel pump nozzle.

2. For a vehicle with a body having an opening therein to introduce fuel to a fuel tank, an improved fuel filler assembly, comprising: tubular inlet means between the body opening and the fuel tank and with an enlarged portion aligned with the body opening and a lesser portion more inwardly from the vehicle body forming a shoulder; a closure sea member of flexible material having a seal surface for engaging the shoulder to seal the tank inlet when the closure is in a closed operative position; a panel member configured to cover the body opening and being mounted with respect to the body so that it can be moved between closed and opened operative positions; means attaching the panel and the closure seal member so that they normally move together as the panel is pivoted between its closed and opened positions; a generally cylindrically shaped and tubular funnel member within the tubular inlet with an outwardly projecting flange portion thereon to limit inward axially movement away from the body opening when in a closed position corresponding to the closed position of the panel and closure seal member; a flexible strap between the funnel member and the closure seal to move the funnel member axially outward in the inlet tube toward the body opening as the panel and closure seal are pivoted to their open operative position whereby the funnel is positioned to be more accessible to receive the fuel pump nozzle.

3. The filler assembly set forth in claim 2 in which the closure seal has a stepped configuration with a larger portion adjacent the panel an a smaller portion outward therefrom; the tubular inlet defining a relatively large portion and a smaller portion, the larger portion being closest to the panel and adapted to encircle the larger portion of the closure seal when in its closed operative position, the smaller portion receiving the smaller portion of the closure seal in close fitting relation.

4. The filler assembly set forth in claim 3 in which the panel and the closure seal are attached by means therebetween including projections from the panel and recesses formed in the closure seal which telescopingly engage one another so that the panel and seal normally move as a unit but are capable of separating in response to relative radially movements between the panel and the tubular inlet.

5. The filler assembly set forth in claim 2 in which strap is integrally attached at an inward end to the funnel member and has an outward end portion attached to the closure seal by a pin thus allowing the end portion to pivot relative to the closure seal.

* * * * *